United States Patent [19]
Schnee

[11] Patent Number: 6,057,880
[45] Date of Patent: *May 2, 2000

[54] NAVIGATION SYSTEM FOR A MARINE VESSEL IN LOW LIGHT CONDITIONS

[76] Inventor: Robert Alan Schnee, 2905 Pacific Ct., Irving, Tex. 75062

[ * ] Notice: This patent is subject to a terminal disclaimer.

[21] Appl. No.: 08/980,102

[22] Filed: Nov. 26, 1997

Related U.S. Application Data

[63] Continuation of application No. 08/886,660, Jul. 2, 1997, Pat. No. 5,751,344, which is a continuation of application No. 08/498,167, Jul. 5, 1995, abandoned.

[51] Int. Cl.⁷ .................................................. H04N 7/18
[52] U.S. Cl. ......................................... 348/113; 348/148
[58] Field of Search .................................. 348/36, 37, 38, 348/39, 61, 113, 114, 115, 116, 117, 118, 119, 120, 143, 148, 149, 162, 164

[56] References Cited

U.S. PATENT DOCUMENTS

| | | | |
|---|---|---|---|
| Re. 33,572 | 4/1991 | Meyers | 250/504 R |
| 3,689,695 | 9/1972 | Rosenfield | 348/148 |
| 3,867,633 | 2/1975 | Patrick et al. | 250/334 |
| 3,889,052 | 6/1975 | Back | 348/148 |
| 3,945,721 | 3/1976 | Corcoran | 353/84 |
| 4,000,419 | 12/1976 | Crost et al. | 250/214 VT |
| 4,086,511 | 4/1978 | Redman | 313/525 |
| 4,108,551 | 8/1978 | Weber et al. | 356/4.01 |
| 4,124,798 | 11/1978 | Thompson | 250/214 VT |
| 4,131,818 | 12/1978 | Wilder | 250/214 VT |
| 4,411,490 | 10/1983 | Daniel | 126/648 |
| 4,524,385 | 6/1985 | Billingsley et al. | 348/164 |
| 4,529,830 | 7/1985 | Daniel | 136/246 |
| 4,579,338 | 4/1986 | Heffron | 348/730 |
| 4,653,879 | 3/1987 | Filipovich | 250/330 |
| 4,655,562 | 4/1987 | Kreitzer | 250/330 |
| 4,658,139 | 4/1987 | Brennan et al. | 250/330 |
| 4,724,357 | 2/1988 | Drinkwine | 313/524 |
| 4,796,090 | 1/1989 | Fraier | 348/147 |
| 4,822,994 | 4/1989 | Johnson et al. | 250/214 VT |
| 4,843,229 | 6/1989 | Reed et al. | 250/214 VT |
| 4,853,098 | 8/1989 | Drinkwine | 204/192.28 |
| 4,920,412 | 4/1990 | Gerdt | 348/31 |
| 4,947,044 | 8/1990 | Pinson | 250/330 |
| 4,980,565 | 12/1990 | Jehle | 250/334 |
| 4,991,183 | 2/1991 | Meyers | 372/109 |
| 5,081,585 | 1/1992 | Kurami | 348/118 |
| 5,214,285 | 5/1993 | Metivier | 250/330 |
| 5,224,861 | 7/1993 | Glass | 348/121 |
| 5,270,545 | 12/1993 | Phillips et al. | 250/330 |
| 5,282,013 | 1/1994 | Gregoris | 356/4.07 |
| 5,283,427 | 2/1994 | Phillips et al. | 250/214 VT |
| 5,289,321 | 2/1994 | Secor | 348/118 |
| 5,311,019 | 5/1994 | Gammarino | 250/338.3 |
| 5,332,899 | 7/1994 | Wolny et al. | 250/332 |
| 5,338,933 | 8/1994 | Reeves et al. | 250/334 |
| 5,381,338 | 1/1995 | Wysocki | 348/116 |
| 5,515,042 | 5/1996 | Nelson | 348/118 |
| 5,566,087 | 10/1996 | Voigt | 364/505 |

*Primary Examiner*—Bryan Tung
*Attorney, Agent, or Firm*—Daniel F. Perez; Gardere & Wynne, L.L.P.

[57] ABSTRACT

An aid for marine navigation includes a low-light video camera mounted within a weather-proof enclosure on a vantage point of a marine vessel for improved night vision. A conventional video camera is also mounted with the low-light video camera for daytime viewing. Video signals from the cameras are automatically selected depending on light conditions for transmission to a cabin of the vessel. Motors rotate the housing in a horizontal plane and in a vertical plane for enabling remote-controlled aiming of the cameras from the helm of the marine vessel. Sensors provide information on azimuth and elevation of the cameras for overlaying the video signal transmitted from the camera housing with this information for display with the video image on a monitor near the helm. Information on longitude and latitude, as well as vessel velocity and direction, from a global satellite positioning system receiver is also displayed. The overlayed video signal is RF modulated on to a predetermined channel for distribution to television receivers in other locations on the vessel.

1 Claim, 2 Drawing Sheets

NAVIGATION SYSTEM FOR A MARINE VESSEL IN LOW LIGHT CONDITIONS

This application is a continuation of U.S. Ser. No. 08/886,660 filed Jul. 2, 1997, now U.S. Pat. No. 5,751,344 which is a continuation of Ser. No. 08/498,167 filed Jul. 5, 1995, now abandoned.

TECHNICAL FIELD

This invention relates generally to navigation aids for marine vessels having light intensification systems for navigation in low-light conditions.

BACKGROUND OF THE INVENTION

Ships and other nautical vessels are frequently under way at night. Generally, unaided human sight is relied on for steering and navigating the vessel at night. Lights on other ships and on shore often provide enough information to a ship's captain or helmsman to avoid major obstacles, especially in the open sea. However, along the intracoastal waterway, and in lakes and rivers and ocean shores there are often many unmarked obstacles that are dangerous and must be avoided.

Radar is often used to aid human sight in spotting and tracking other vessels on the open sea and large harbors, especially at distances greater than can be seen with the naked eye. However, in confined areas, the radar image reflected by the surrounding terrain and other objects on or near the water will typically be somewhat cluttered and often will not clearly delineate the shore or other obstacles and hazards due to differences in reflectivity of the various objects.

More recently, devices used by the military for amplifying or intensifying ambient light have become commercially available and have been proven useful for navigating marine vessels in low light and nighttime conditions in confined areas. These light intensification devices are hand-held, requiring a captain or other individual responsible for steering the ship or vessel to periodically stand in a location best for viewing.

SUMMARY OF THE INVENTION

The present invention is directed to a navigation system especially adapted for use in a marine vessel that provides visual and positional information for use in steering and navigating the vessel at night or in low-light conditions. The system includes a low-light video camera that is attached to a marine vessel, preferably at a relatively high vantage point having wide, unobstructed views, using a remotely controlled, motor-driven, pivoting mount panning the camera. A video output signal of the low-light camera is transmitted to a cabin of the marine vessel for presentation on a video monitor. A remote controller for operating the motors on the mount to aim the low light camera is placed near the video monitor. The invention thus has the advantage of providing to one or more video monitors placed inside the vessel's cabin to permit continuous nighttime viewing of a vessel's surroundings to more than one person from a better advantage point on the vessel.

According to one aspect of the invention, the mount includes sensors for transmitting signals indicating azimuth and elevation of the aim of the camera mount. These signals are converted to visual representations of the azimuth and elevation for overlaying onto the video signal before it is displayed. Since a nighttime image from low-light may not contain any recognizable objects, aiming the camera based solely on the transmitted image may not be possible in certain circumstances, or the person aiming the camera with the remote controller may become easily disoriented. Displaying the azimuth and elevation signal ensures proper camera orientation from a remote location and alignment in the direction of travel of the vessel even when there are no discernable images being transmitted by the camera.

According to a preferred embodiment of the invention, the video signal from the camera is also overlaid with information representing the vessel's latitude and longitude that is generated by a global positioning satellite system (GPSS) receiver. The same information on latitude and longitude may also be provided to the computer for generation of a local nautical map having an indication of the vessel's position. The image of the map can be alternated with or shown simultaneously with the image of the low light camera for complete presentation of nighttime navigation information. The overlaid video signal from the low light video camera is also RF modulated and distributed through a shipboard television network to a plurality of television receivers located throughout the vessel. A captain or others on board is thus able to check and monitor navigation information without having to go to the vessel's bridge by tuning to a predetermined channel. A daylight video camera, mounted along-side the low-light video camera, enables daytime images to be distributed around the vessel for monitoring and improved daytime navigation using images from the vantage point of the mounted cameras. A photo-sensor automatically selects the video signal from either the low-light or the normal light video camera for transmission from the camera mount depending on light conditions. The automatic selection can be turned off or manually overridden if desired.

BRIEF DESCRIPTION OF THE DRAWINGS

A more complete understanding of the present invention and the advantages thereof may be had by reference to the following Detailed Description when taken in conjunction with the accompanying Drawings wherein.

DETAILED DESCRIPTION OF THE INVENTION

Figure 1:
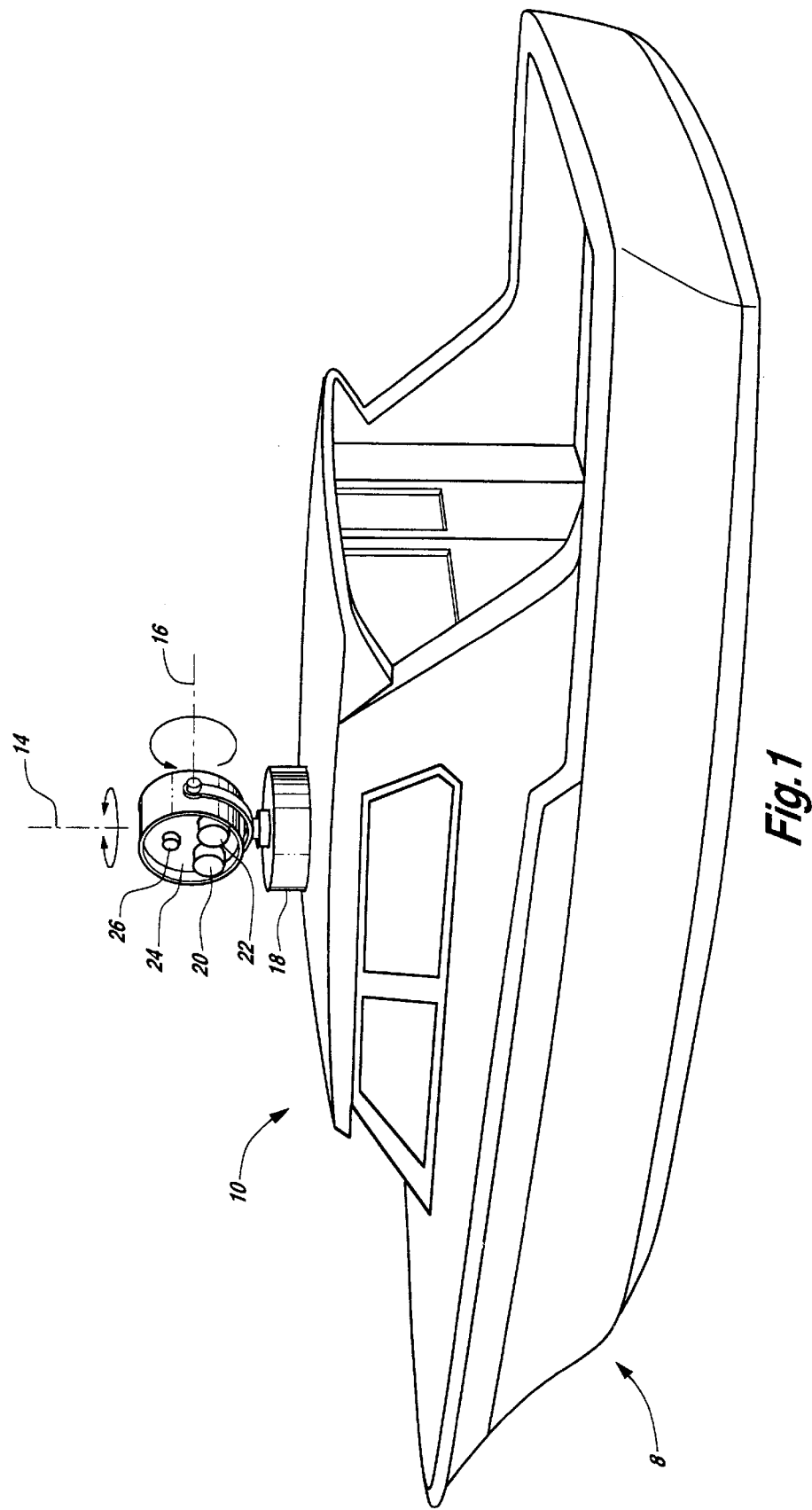
FIG. 1 is a perspective view of a marine vessel incorporating the present invention.

Reference is now made to the accompanying drawings wherein like reference characters denote like or similar parts throughout the drawings.

In FIG. 1, marine vessel 8 is intended to represent any sort of pleasure craft, ship or other floating vessel. The marine vessel typically includes, though not in every case, one or more enclosed cabins 10, one of which houses the helm of the vessel. The helm or a secondary helm may be located outside the cabin. A camera housing 12 is affixed to an exterior surface of a marine vessel 8 using a mount that permits rotation of the housing about axis 14, generally in a horizontal plane, and axis 16, generally in a vertical plane. The camera housing is preferably mounted in a location on the vessel that offers a relatively unobstructed view, at least in the forward directions, and a high vantage point. It can be mounted to a mast or pole if necessary. The position and mounting of the camera housing preferably permits rotation through three hundred, sixty degrees in the horizontal plane and sixty degrees in the vertical plane.

Two electric motors, one mechanically coupled to the camera housing mount for tilting the camera housing about axis 16 and the other one coupled to the mount for panning the camera housing about axis 14, are disposed within motor housing 18. The motor housing is sealed for protection against water. Within camera housing 12 are mounted a low-light video camera and a conventional video camera, both aimed in the same direction, as seen by their respective focusing lenses 20 and 22 pointing through opening 24 in the housing. The opening in the camera housing is covered with a clear lens to establish a weather-resistant enclosure that protects the cameras from water. The low-light video camera is a combination of a light intensifying device, such as a Noctron Model VI light intensification device distributed by Aspect Technology and Equipment, Inc. of Plano, Tex., and charge coupled device (CCD) video camera, such as model UL-K-500 manufactured by Ultrack. The light intensification device amplifies the optical image received by the device up to 50,000 times. The CCD video camera receives the amplified optical image, processes the image and provides an EIA RS170 video formatted signal encoded with the amplified optical image for transmission along a cable (not shown). A photocell 26 is also mounted next to the two cameras for sensing ambient light conditions.

Figure 2:
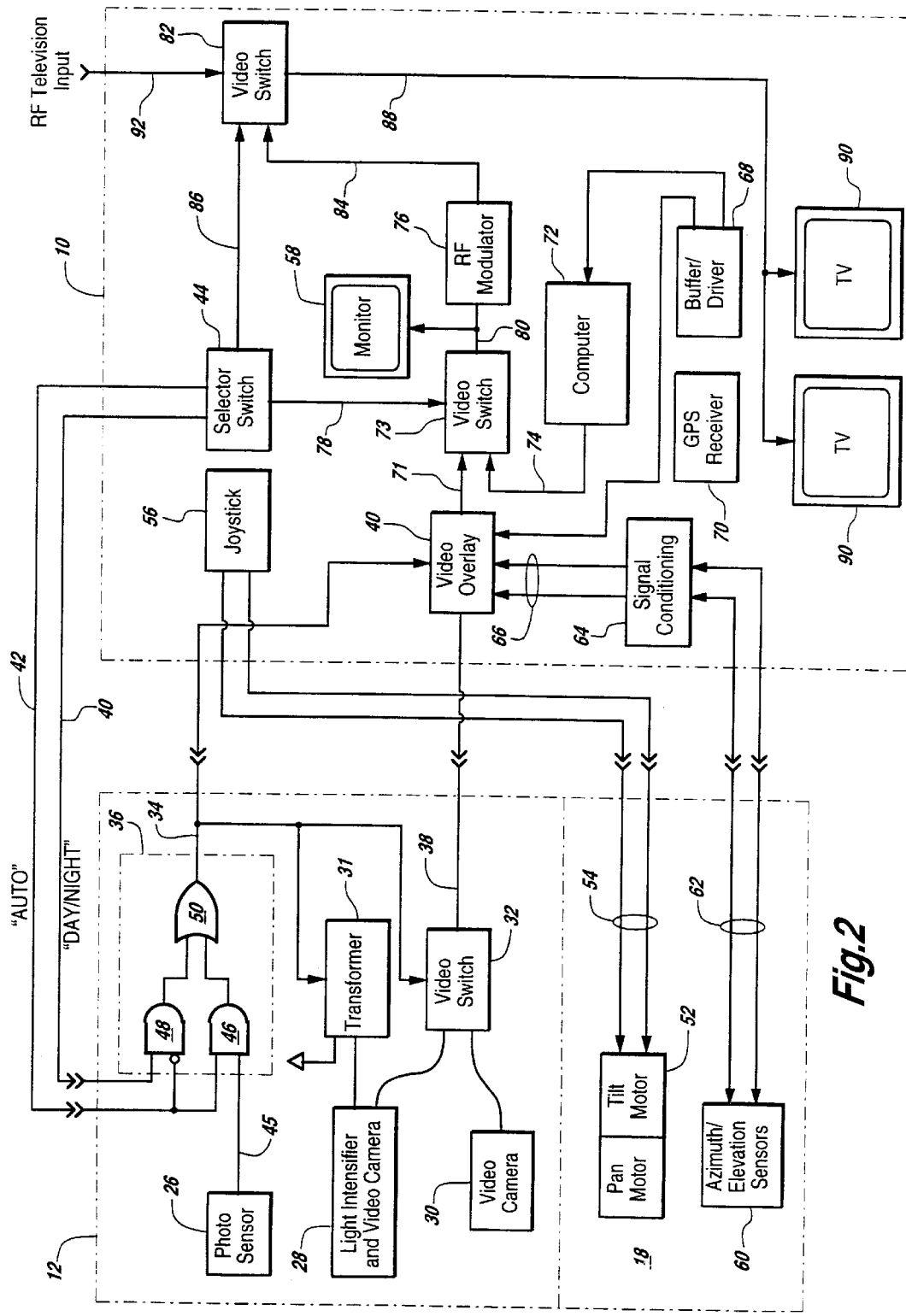
FIG. 2 is a schematic diagram of the present invention.

Referring to FIG. 2, the video signal outputs of the low-light camera 28 for night time use and the conventional video camera 30 for daylight use in camera housing 12 are connected through coaxial cables to video switch 32. The video switch selects, in response to a camera selection signal on line 34 generated by camera select circuit 36, one or the other video signal for transmission on cable 38 to video overlay circuit 40 located within the cabin 10. The camera select circuit 36 receives selection mode signals on lines 40 and 42 from manually operable selector switch 44 in cabin 10. The selector switches 44 include a plurality of manually operable mechanical or electronic switches generating signals for generating signals for indicating, among other things, automatic camera selection mode or manual selection of one camera or the other. All cameras are in place, each of the plurality of switches could be placed throughout the vessel as desired. When the camera select circuit is in an automatic mode, the output of photosensor 26 determines selection of the low-light camera 28 or conventional camera 30. Line 42 carries a voltage signal indicating whether the selection mode is automatic or manual. This signal is logically "anded" with the output of the photosensor on line 45 by AND gate 46. The output signal of the photosensor on line 45 indicates by its voltage level whether sensed ambient light intensity is above or below a predetermined threshold. The inverse of the automatic mode signal on line 42 and the Day/Night signal on line 40 are "anded" by AND gate 48. The voltage level of the DAY/NIGHT signal indicates which camera is selected when in manual mode. The outputs of AND gates 46 and 48 are logically "ored" by OR gate 50, the output of which is the camera select signal on line 34. The camera select signal is also transmitted to video overlay circuit 40 and to voltage transformer circuit 31. The voltage transformer circuit steps down the voltage supplied to the camera housing for use by the light intensifier of low-light camera 28. The camera select signal on line 34 turns the transformer circuit on only when the low-light camera is selected.

As described in connection with FIG. 1, pan and tilt motors 52 rotate the camera housing and enable remote aiming of the cameras using signals on lines 54 generated by joystick controller 56. The joystick controller is preferably physically adjacent selector switches 44 and video monitor 58, all of which are preferably, though not necessarily, located near the helm or on or near the bridge of the marine vessel. Additional joysticks and selector switches could be, if desired, located in other areas of the vessel, in the captain's cabin, for example. Azimuth and elevation sensors 60 are physically coupled to the mount for the camera housing 12 to sense relative rotation of the camera housing with respect to mutually orthogonal axes fixed with respect to the vessel. These axes preferably lie substantially within horizontal and vertical planes when the vessel is in a normal attitude and indicate with signals on lines 62 the azimuth of the camera housing with respect to the forward direction of the vessel and the elevation of the camera housing with respect to the horizon. One preferred embodiment for the sensors are potentiometers whose resistances vary with the relative rotational positions of the camera housing. Thus the voltage level of the signals on lines 62 represent the azimuth and elevation of the camera housing and, thus, the aim of the cameras. The signals on line 62 must be conditioned or converted by signal conditioning circuit 64 into a proper input format for video overlay circuit 40. For commercially available video overlay circuits, each voltage signal representing azimuth or altitude must be converted using one-shot multi-vibrators in signal conditioning circuit 64 into a variable-width pulse. When the voltage changes, another pulse is sent on lines 66 to video overlay circuit 40.

Video overlay circuit 40 is a commercially available device that includes a programmable processor for generating and overlaying characters onto the video signal on line 38. It receives the azimuth and elevation signals on lines 66 from signal conditioning circuit 64 and converts them to visual displays for overlaying onto the video signal. Similarly, it receives the camera selection signal on line 38 and in response generates and overlays onto the video signal one of two preprogrammed messages, "Night" or "Day", depending on the signal. The video overlay circuit also includes an RS232 serial port for connection to buffer/driver 68. Buffer/driver 68 receives data signals form global positioning satellite system (GPSS) receiver 70 and provides them to the serial ports of the video overlay circuit 40 and computer 72. The data signals contain information in ASCII formatted characters on the vessel's latitude and longitude, as well as velocity and direction, calculated by the GPSS receiver. The video overlay circuit generates a display of this navigational information and overlays it onto the video signal received on line 38 and transmits the overlaid signal on line 71 to video switch 73.

Computer 72 is programmed with a map generator program that generates a nautical map of the local area from map images stored on media such as CD-ROM retrieved by the computer in response to receiving data on longitude and latitude of the vessel from the GPSS receiver 70. On the map is an indication of the position of the vessel relative to the local area. The computer includes an adapter for generating a video output signal that is encoded with the map image and sent to video switch 73 on line 74.

Video switch 73 selects the overlaid video camera signal on line 71 or the map video signal on line 74 for connection with video monitor 58 and radio frequency (RF) modulator 76. A selection signal on line 78 is generated by selector switch 44, which enables manual selection of either the camera video signal or the map video signal for output onto line 80 for display on monitor 58. Alternately, video monitor 58 may be replaced with a television receiver connected to receive the modulated output of RF modulator 76.

RF modulator 76 modulates the video signal present on line 80 onto a predetermined television channel frequency. Video switch 82 responds to a camera mode signal on line 86 that is generated by selector switches 44. In the camera mode, video switch 82 connects the RF video signal on line 84 to cable 88 for transmission to a plurality of television monitors 90 located throughout the vessel. When not in the camera mode, the video switch 82 connects the RF television input on line 92 to cables. The RF television input can come from several sources: an antenna receiving broadcast RF television signals, a cable system transmitting RF television signals, a satellite dish receiving microwave frequency television signals from satellites, a device for playing back prerecorded programs or combinations of these sources. If simultaneous distribution of RF television signals on line 92 and the RF video signal on line 84 is desired, a notch filter tuned to the same predetermined channel of RF modulator 76 can be switched into line 92 to remove the channel to which RF modulator is tuned from the RF television input on line 92.

Although preferred and alternative embodiments of the present invention have been illustrated in the accompanying Drawings and described in the foregoing Detailed Description, it will be understood that the invention is not limited to the embodiments disclosed, but is capable of numerous rearrangements, modifications and substitutions of parts, and elements without departing from the spirit of the invention.

What is claimed is:

1. A marine navigation system for use in conjunction with vessels having a helm and a separate captain's cabin, including:

a camera housing;

a low-light video camera mounted in the housing for generating video output signals and having a predetermined aiming direction, a lens for focusing an image on a light amplifier for light amplification, and an image sensor coupled to the light amplifier;

a conventional video camera mounted in the housing for generating video output signals and having the same aiming direction as the low-light video camera;

a photo sensor means mounted in the housing for sensing ambient light conditions;

a first motor driven positioner for selectively pivoting the housing and therefore the low-light camera, the conventional video camera, and the photo sensor about a nominally vertical axis through an arc of about 360 degrees;

a second motor driven positioner for selectively pivoting the housing and therefore the low-light camera, the conventional video camera, and the photo sensor about a nominally horizontal axis through an arc of about 60 degrees;

circuitry for generating an azimuth signal indicative of the positioning of the housing and therefore the low-light and conventional video cameras relative to the nominally vertical axis;

circuitry for generating an elevation signal indicative of the positioning of the housing and therefore the low-light and conventional video cameras relative to the nominally horizontal axis;

circuitry responsive to the output of the photo sensor for automatically selecting either the low-light video camera or the conventional video camera depending on ambient light conditions;

a selector switch for selecting either the low-light video camera or the conventional video camera notwithstanding the ambient light conditions as determined by the photo sensor;

a first position controller mounted at the helm of the vessel for selective actuation to cause the first and second motor driven positioners to pivot the housing about the nominally vertical axis and about the nominally horizontal axis and thereby aiming the low-light video camera and the conventional video camera at a pre-determined target;

a first video display device mounted at the helm of the vessel for receiving video signals either from the low-light video camera or from the conventional video camera and for displaying the received signals;

a second position controller mounted in the captain's cabin of the vessel for selective actuation to cause the first and second motor driven positioners to pivot the housing about the nominally vertical axis and about the nominally horizontal axis and thereby aiming the low-light video camera and the conventional video camera at a pre-determined target;

a second video display device mounted in the captain's cabin for receiving video signals either from the low-light video camera or from the conventional video camera and for displaying the received signal;

circuitry responsive to the azimuth and elevation signal generating circuitry for overlying data indicative of the azimuth and elevation of the housing on the image displayed on the first and second video display devices;

conventional television signal receiving circuitry mounted on the vessel;

circuitry for selectively displaying signals received by the conventional television signal receiving circuitry on either the first video display device, or on the second video display device, or both;

circuitry for determining vessel speed and direction and for overlaying visual representations of the vessel speed and direction on the image displayed on either of the first video display device or on the second video display device, or both;

global positioning signal receiving circuitry mounted on the vessel for generating output signals indicative of the longitude and latitude of the vessel; and circuitry for displaying the output of the global positioning signal receiving circuitry on either of the first and second video display devices, or both.

* * * * *